(No Model.)

S. W. MACKEY.
HOOF EXPANDER.

No. 426,831. Patented Apr. 29, 1890.

Witnesses:
Edwin L. Bradford
C. D. Davis

Inventor:
S. W. Mackey
By C. M. Alexander
Attorney

UNITED STATES PATENT OFFICE.

SAMUEL W. MACKEY, OF BALTIMORE, MARYLAND.

HOOF-EXPANDER.

SPECIFICATION forming part of Letters Patent No. 426,831, dated April 29, 1890.

Application filed February 12, 1890. Serial No. 340,188. (No model.)

*To all whom it may concern:*

Be it known that I, SAMUEL W. MACKEY, a citizen of the United States, residing at Baltimore, in the State of Maryland, have invented certain new and useful Improvements in Hoof-Expanders, of which the following is a specification, reference being had therein to the accompanying drawings.

This invention relates to certain improvements in hoof-expanders for horses; and it has for its objects to preserve the foot of the animal in a normal condition after being shod, and to restore it to such condition should it have become injured or contracted. The frog of a horse's foot in exercising its natural functions in traveling keeps the hoof expanded properly; but when a shoe is applied, by preventing the contact of the frog with the earth and by binding the hoof, it gives rise to corns, lameness, quarter-cracks, and other hoof troubles.

My invention is designed to obviate these objections and to provide an expander which will exert a proper pressure upon the hoof, so as to expand it outwardly, which will be of little weight, and which may be easily applied, removed, and retained in place, and which can be so located as to be practically out of the way while the animal is moving, so that it cannot be readily injured.

Figure 1:
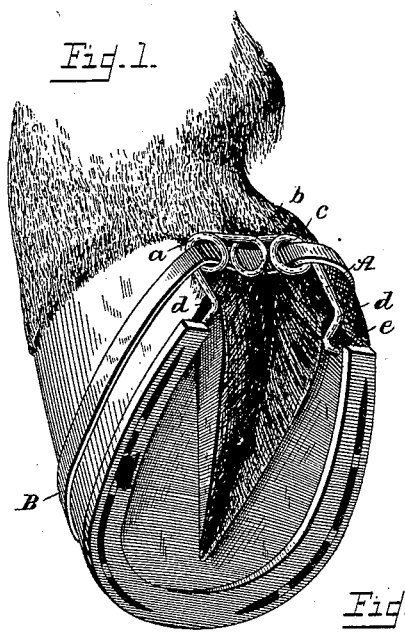
Figure 2:
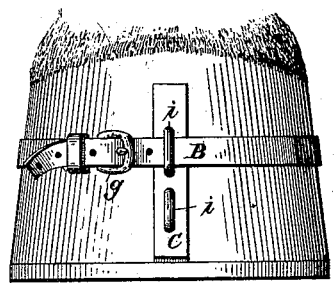
Figure 6:
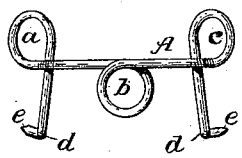
Figure 5:
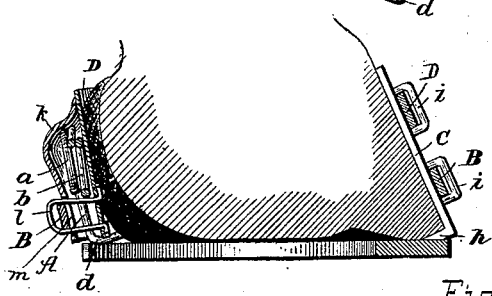
Figure 3:
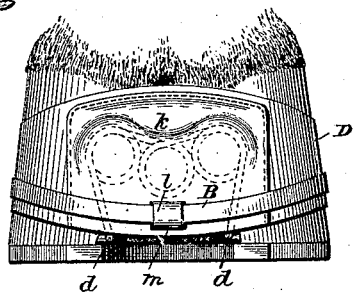
Figure 7:
Figure 4:
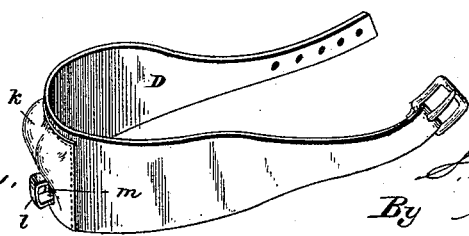

In the accompanying drawings, forming part of this specification, Figure 1 represents a perspective view of a horse's hoof, showing my invention applied thereto. Fig. 2 represents a front view of a horse's hoof, showing a portion of the devices by which the improved expander may be attached. Fig. 3 represents a rear view of the hoof, showing my invention applied thereto. Fig. 4 represents a perspective view of a circlet or strap employed for attaching the hoof-expander to the hoof for heavy work. Fig. 5 is a sectional view of the hoof, showing my invention applied. Fig. 6 is a rear elevation of one form of the expander detached, and Fig. 7 is a side elevation of an instrument to be employed in fitting the expander to the hoof and removing the same.

Referring to the drawings, the letter A indicates the hoof-expander, which consists of a single piece of wire having three circular bends midway between its ends, as indicated by the letters *a*, *b*, and *c*, and bent forwardly near its ends, as indicated by the letter *d*, the ends being bent laterally at about right angles and terminating in pointed projections *e*, which enter recesses in the inner walls of the quarters of the hoof when in place. The circular bends of the expander when in position extend up back of the heel of the hoof, as shown, so as to allow the ends to play freely laterally and be out of the way of the lower surface of the foot.

The letter B indicates a strap, by means of which the expander may be secured to the hoof. The said strap is provided with a buckle *g* at one end and with a series of tongue-openings at the other, by means of which the strap may be secured around and tightened upon the hoof, as shown in Fig. 2 of the drawings. In securing the expander the strap is preferably passed through the circular bends *a* and *c* of the expander, as shown in Fig. 1 of the drawings, and the ends buckled together, as shown in Fig. 2.

The letter C indicates a short metallic bar, which rests against the toe of the hoof, and which is provided at its lower end with a short inwardly-projecting spike or spur *h*, which enters a recess made for the purpose in the lower edge of the hoof, between the hoof and shoe, so as to hold the bar in place. The bar on its forward face is provided with staples or loops *i*, through which one or more of the securing-straps may be passed to hold the expander in place.

The strap B is employed to hold the expander in place when the animal is stabled or is employed for light work; but when employed for heavy work a circlet D, as shown in Figs. 4 and 5 of the drawings, is substituted. The said circlet consists of a band of leather or other material broadened midway between its ends and terminating at said ends in straps, one of which is provided with a buckle and the other with tongue-apertures for fastening the ends together. The broadened or front portion of the circlet is provided with a pocket or pouch *k*, which may be passed over the circular bends and rear portion of the expander, so as to inclose, support, and protect the same. The forward face of the circlet, inside the pocket, has secured to it a looped strap *l*, which engages below the central circular bend, or the central portion of the expander, to hold it in place. The front of the pocket opposite the loop of the strap is provided with an opening m, through which said loop may be passed and fastened by one end of a securing-strap, as shown in Figs. 3 and 5 of the drawings.

In securing the loop l to the circlet D its ends are preferably passed through slots formed in the circlet and stitched to the back thereof, as shown in Fig. 5. This construction prevents the strap from interfering with the application of the circlet to the expander and the hoof.

The expander shown in Fig. 6 differs from the one shown in the other figures only in that it has the loops a c turned upwardly instead of downwardly. Either form may be employed, and the number of loops may be decreased or increased without departing from the invention in the least.

The tool I prefer to employ to remove and apply the expander is shown in Fig. 7, and it consists simply of a pair of tong-like levers pivoted together and provided near their forward ends on their inner faces with notches x, adapted to engage the arms of the expander, as is evident.

As constructed, it will be seen that the expander may be used with a shoe or independently thereof, and by being made of spring brass or steel wire may be constructed to give a pressure of from fifteen to twenty pounds to the hoof, and may be made to fit hoofs of various sizes and applied so as to effect a cure in hoofs that may have been previously injured or to preserve a natural hoof in its normal condition. It will be further observed that the expander may be applied to and removed from the hoof by the use of the instrument shown without employing skilled labor, and that as it is wholly out of the way and secured to the heel of the hoof when in position it is protected from injury and wear, which would occur if placed at the sole of the foot.

It is evident that the spring or expander may be made of any form so long as it is so constructed as to extend within the quarters of the hoof and up over the same on the outside without departing from the spirit of my invention.

Having thus fully described my invention, what I claim, and desire to secure by Letters Patent, is—

1. The combination, with a hoof-expander adapted to be fitted to the heel of the hoof and extended upwardly over the quarters of the hoof, of a front plate having a spur or spike at its lower end and loops on its forward face, and a strap whereby the expander may be secured to the hoof, substantially as specified.

2. The combination, with a hoof-expander fitted to the heel of the hoof and extended upward over the quarters thereof, of a circlet provided with a pocket at its rear and fastening devices at its ends, whereby it may be secured around the hoof and over the expander, so as to secure the same, substantially as specified.

3. The combination, with a hoof-expander adapted to be secured to the heel of the hoof and extended upwardly over the quarters thereof, of a circlet D, provided with a pocket adapted to inclose and protect the upwardly-extending portion of the expander, a loop l, secured to the circlet and passing through a slot in the side of the pocket, and a strap encircling the hoof and passing through the loop l outside of the pocket, substantially as described.

4. A hoof-expanding spring for horses, having arms bent so as to be inserted between the "frog" and the heel of the hoof and pressing outward, said spring being adapted to pass upward over the "quarter" of the foot, substantially as and for the purpose represented.

In testimony whereof I affix my signature in presence of two witnesses.

SAMUEL W. MACKEY.

Witnesses:
C. D. DAVIS,
H. J. ENNIS.